United States Patent [19]

Wenninger et al.

[11] 4,156,921
[45] May 29, 1979

[54] ADAPTABLE PROGRAMMED CALCULATOR INCLUDING AUTOMATIC DECIMAL POINT POSITIONING

[75] Inventors: Freddie W. Wenninger; Donald E. Morris; Jindrich Kohoutek; David S. Maitland; Douglas M. Clifford; Louis T. Schulte; John C. Keith, all of Loveland, Colo.

[73] Assignee: Hewlett-Packard Company, Palo Alto, Calif.

[21] Appl. No.: 680,837

[22] Filed: Apr. 28, 1976

Related U.S. Application Data

[60] Division of Ser. No. 477,552, Jun. 6, 1974, Pat. No. 3,971,925, which is a continuation of Ser. No. 318,451, Dec. 26, 1972, abandoned.

[51] Int. Cl.² .......................... G06F 3/02; G06F 3/12; G06F 3/14
[52] U.S. Cl. .................................................... 364/744
[58] Field of Search .............. 235/156, 159, 160, 164, 235/61 DP; 340/172.5; 364/744, 900

[56] References Cited

U.S. PATENT DOCUMENTS

| | | | |
|---|---|---|---|
| 3,405,392 | 10/1968 | Milne et al. | 340/172.5 |
| 3,546,676 | 12/1970 | Ragen | 340/172.5 |
| 3,588,841 | 6/1971 | Ragen | 340/172.5 |
| 3,634,666 | 1/1972 | Ragen | 235/156 |
| 3,654,449 | 4/1972 | Boyce | 235/156 |
| 3,657,529 | 4/1972 | Hamano | 235/159 |
| 3,760,171 | 9/1973 | Wang et al. | 235/156 |
| 3,839,630 | 10/1974 | Olander, Jr. et al. | 235/156 |
| 3,971,925 | 7/1976 | Wenninger et al. | 235/156 |

*Primary Examiner*—David H. Malzahn
*Attorney, Agent, or Firm*—William E. Hein

[57] ABSTRACT

An adaptable calculator is provided by employing five MOS/LSI circuits interconnected by a multiple line bus system. They include (1) a read-only memory circuit group; (2) a control and timing circuit; (3) an arithmetic and register circuit; (4) a data storage circuit; and (5) an input/output (I/O) circuit.

Input and output units include a keyboard input unit and an 18-column output printer unit. An optional LED display unit may be plugged into the calculator mainframe. The keyboard input unit includes an AUTO DECIMAL POINT key for selecting an automatic decimal point mode of calculator operation in which the calculator automatically places the decimal point at a specified location in all entered data. Thus, the operator need not manually enter the decimal point in entered data. The calculator may be operated manually by the user from the keyboard input unit or automatically by a program stored in the calculator memory.

4 Claims, 2 Drawing Figures

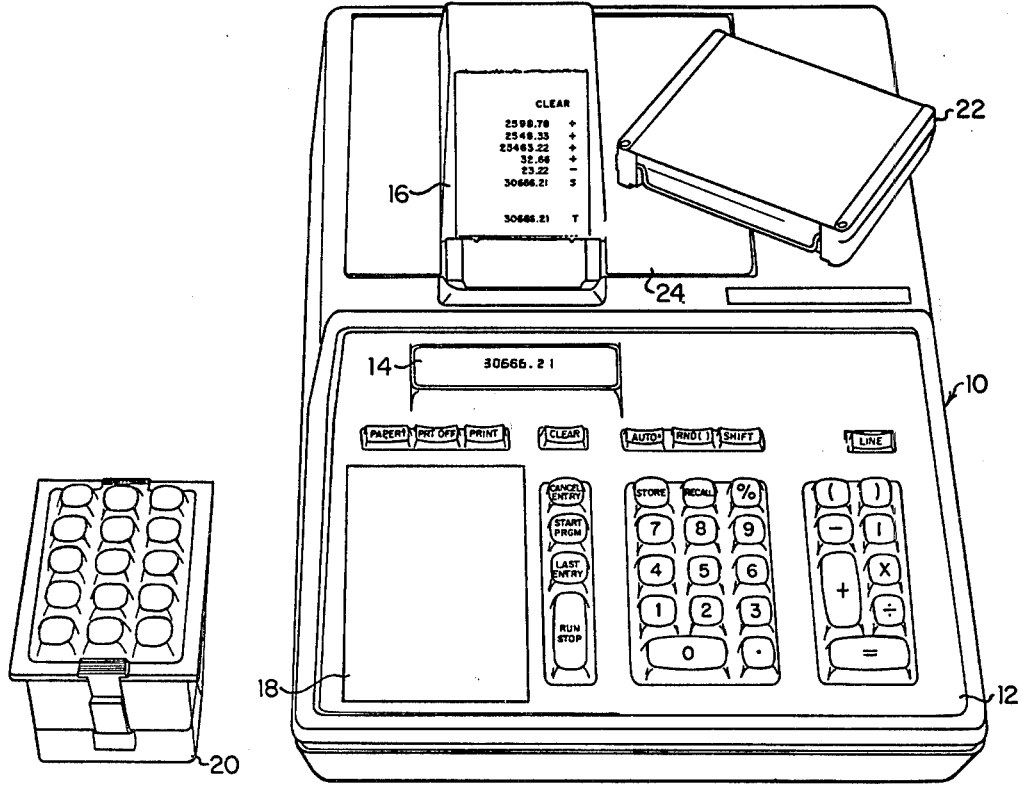

ADAPTABLE PROGRAMMED CALCULATOR INCLUDING AUTOMATIC DECIMAL POINT POSITIONING

CROSS REFERENCE TO RELATED APPLICATION

This is a division of application Ser. No. 477,552, filed on June 6, 1974, and issued on July 27, 1976, as U.S. Pat. No. 3,971,925, which is in turn a continuation of application Ser. No. 318,451, filed on Dec. 26, 1972, now abandoned. The subject matter of U.S. Pat. No. 3,971,925 is incorporated herein by reference.

BACKGROUND OF THE INVENTION

This invention relates generally to calculators and improvements therein and more particularly to calculators which may be easily adapted to meet the specific needs of each user.

Calculators constructed according to the prior art have generally taken one of two approaches toward reducing the labor content of repetitious, routine computational tasks. The first is by means of programmability. The programmable machine has the inherent advantage of program versatility in that it can be programmed to solve problems encountered in nearly all disciplines including mathematics, science, engineering, business, finance, statistics, etc. Unfortunately, this versatility has added significantly to cost. The user is, therefore, paying for considerably more calculating capability and versatility than is required, for instance, in solving repetitive problems related to the same discipline. The approach which has recently been taken to solve this problem is that of a "dedicated" calculator. Such a machine generally has built-in, fixed programming which allows it to handle only a narrow range of problems. Even though these dedicated calculators are less expensive than programmable types, they have a serious shortcoming in that their programs can not be changed.

SUMMARY OF THE INVENTION

Another object of this invention is to provide an adaptable calculator in which the user may designate an automatic decimal point mode for automatically placing the decimal point in entered data at a preselected position.

Other and incidental objects of this invention will become apparent from a reading of this specification and an inspection of the accompanying drawings.

These objects are accomplished in accordance with the illustrated preferred embodiment of this invention by employing a keyboard input unit, an optional light-emitting diode (LED) display, an output printer, and five MOS/LSI circuits.

The keyboard input unit includes a group of data keys for entering numeric data into the calculator, a group of control keys for controlling the various modes of the calculator and the operations of the output printer, a group of operand keys for designating the mathematical operations to be performed on various items of data, and a group of program keys for controlling the execution of library programs stored within a plug-in read-only memory (ROM) or programmable read-only memory (PROM).

The keyboard also includes a blank section which will accommodate a plug-in function block containing fifteen keys and associated read-only memory. Various function blocks may be dedicated to different disciplines and problem solving areas. For example, a dedicated function block oriented toward statistics includes keys whose representative functions would be helpful in solving statistical problems. Likewise, a mathematics function block would include various mathematical functions available as the result of key actuations. In addition, a user-definable function block may be plugged into the calculator keyboard. This block contains fifteen keys, each having a transparent cap which the user may remove for the purpose of inserting a function label. Each of these keys is associated with a particular function or program contained within a plug-in ROM or PROM currently employed with the calculator. Such function or program may then be called by simply actuating the associated key of the user-definable function block.

The optional 15-digit LED output display unit is contained within a plug-in printed circuit board which is automatically accommodated by the calculator.

The 18-column output printer unit is an integral part of the calculator and gives a printed record of entered data, arithmetic operators, calculated results, and diagnostic notes. Printing may be suppressed and otherwise controlled by means of keys on the keyboard input unit.

The MOS/LSI circuits include eight read-only memory circuits in which subroutines for performing various functions are stored. These circuits also supervise program execution and serve to control any peripheral input/output units which may be connected to the calculator. The read-only memory group comprises these eight individual read-only memory circuits which are identical in structure and differ only in the way in which they are programmed.

A control and timing circuit is used for scanning the keyboard, for retaining status information relating to the condition of the calculator or of a particular subroutine, and for generating a next address in read-only memory.

An arithmetic and register circuit contains an adder, a group of working registers, a group of data storage registers forming a stack, and a constant storage register for storing microprogramming level flags associated with various subroutines.

A data storage circuit provides ten data storage registers, five of which are used for parentheses nesting, three of which are used for performing various internal system housekeeping functions at the microprogram level, one of which is a grand total register which may be interrogated by the user, and the last of which is accessible to the user for storing a single item of data.

The last MOS/LSI circuit, the input/output (I/O) circuit, enables the calculator to communicate with various I/O peripheral units such as a typewriter or an X-Y plotter and determines whether the proper peripheral configuration for running a particular program is present. It also includes a binary arithmetic logic unit (ALU) for performing binary arithmetic, a program address counter used in running programs, and the necessary logic circuit for driving the internal printer unit.

The calculator may be operated manually from the keyboard input unit utilizing functions available as keys on the basic keyboard, on a dedicated plug-in function block, or on a user-definable plug-in function block. The calculator may also be operated automatically from a program comprising user-level language instructions and stored in a plug-in read-only memory unit (ROM), a plug-in programmable read-only memory unit (PROM) or a read/write memory unit associated with a plug-in magnetic card reading and recording unit.

DESCRIPTION OF THE DRAWINGS

The following figures have been numbered in correspondence with the same figures of U.S. Pat. No. 3,971,925, cited above as being incorporated herein by reference.

DESCRIPTION OF THE PREFERRED EMBODIMENT

SYSTEM ARCHITECTURE

Figure 1:
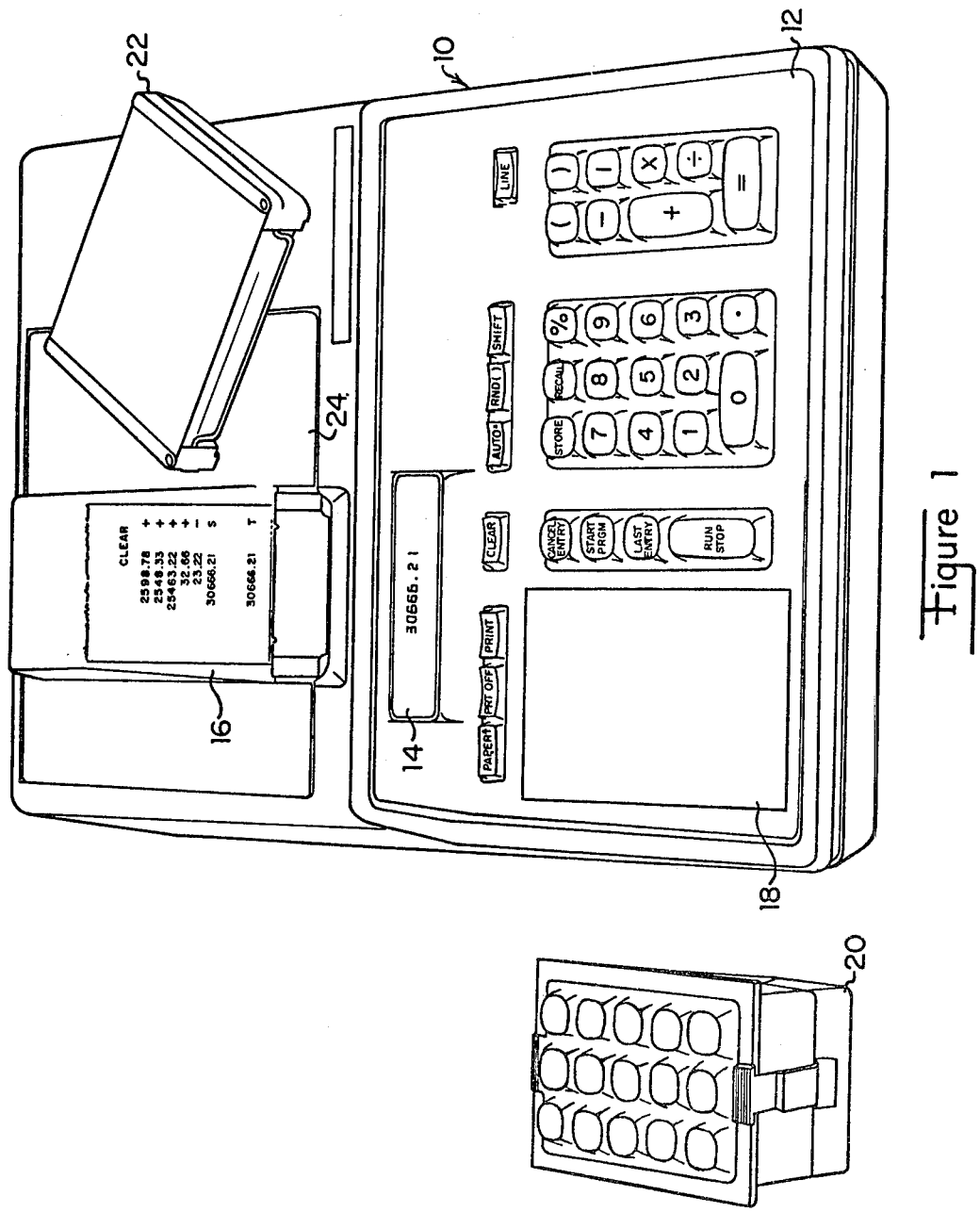
FIG. 1 is a front perspective view of an adaptable calculator according to the preferred embodiment of this invention.

Referring to FIG. 1, there is shown a desk top electronic calculator 10 including a keyboard input unit 12 for entering data and instructions into the calculator, an optional seven-segment LED output display unit 14 for displaying each data entry and the results of calculations performed by the calculator. The calculator also includes an 18-column output printer unit 16 for printing intermediate and final results of calculations, entered data, arithmetic operators, and diagnostic notes. Keyboard input unit 12 also includes a covered blank section 18 which will accommodate a 15-key function block 20 for expanding the capabilities of the calculator. Function block 20 may be oriented toward a particular problem solving area in which case its keys will represent functions which are useful in making calculations relating to that discipline. Alternatively, function block 20 may be a user-definable type in which the various keys may be labeled and defined to be functions or programs stored in a ROM or PROM 22 tailored to the requirements of each user. The function or program so defined may then be executed by simply actuating the associated key on the user-definable function block. ROM or PROM 22 may be removably plugged into the calculator by means of hinged top cover 24. The calculator may employ a ROM or PROM 22 without also employing a plug-in function block 20. In such case, the ROM or PROM contains one or more programs which the user may execute from the main keyboard.

Figure 3:
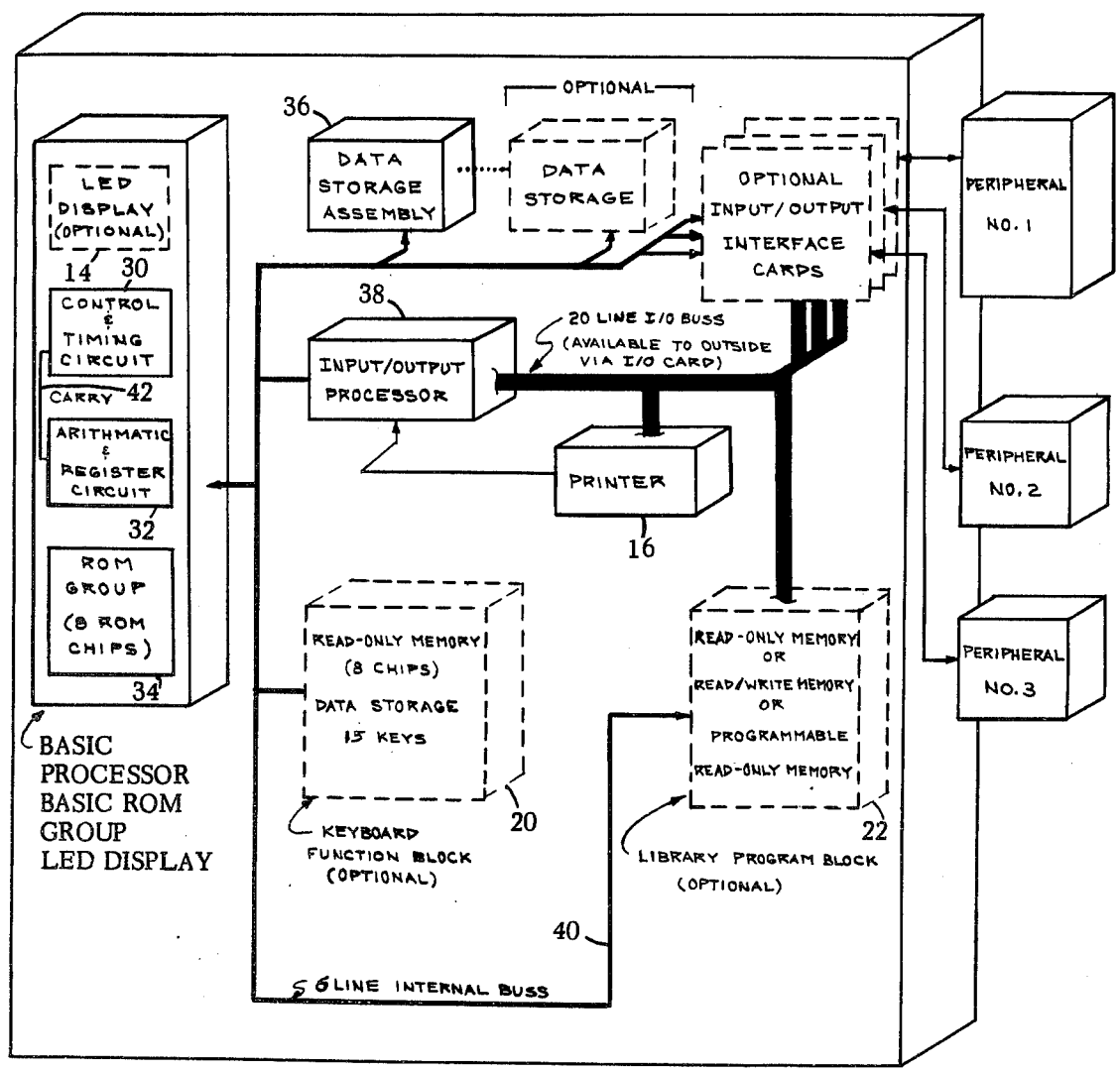
FIG. 3 is a block diagram of the calculator of FIG. 1.

As shown in the overall block diagram of FIG. 3, the calculator also includes an MOS/LSI control and timing circuit 30, an MOS/LSI arithmetic and register circuit 32, eight MOS/LSI read-only memory circuits comprising a read-only memory group 34, an MOS/LSI data storage circuit contained within a data storage assembly 36, and an MOS/LSI input/output circuit contained within an input/output processor 38.

CALCULATOR OPERATION

The basic calculator contains three register locations into which numbers are either entered for immediate use or are stored for later use. These are the X-register, C-register, and RT-register.

Each number which the user enters from the keyboard is placed in the X-register. If the calculator is configured with the plug-in LED display unit, the number is displayed as it is entered. The X-register also receives the result of each mathematical operation.

Each time the EQUALS key is actuated, a result is generated, which is placed in the X-register and also added to the contents of the RT-register for accumulating the result total.

The C-register may be used for storing any constant for later use in making calculations. Whenever the STORE key is actuated, the contents of the X-register are duplicated (stored) in the C-register. Any constant stored in the C-register remains unaltered until either another constant is stored therein or the calculator is switched off. The RECALL key is used to bring the contents of the C-register back into the X-register.

Actuating the CLEAR key erases the contents of the X and RT registers and causes the word CLEAR to be printed on the output printer. CLEAR operations leave the contents of the C-register unaltered.

Actuating the CANCEL ENTRY key erases the X-register but leaves the C and RT registers unaltered.

When operating power to the calculator is removed all storage registers are erased.

In addition to printing CLEAR and tallying keyboard operations, the calculator informs the user of his operating errors by printing diagnostic notes when an error has been made. A table of diagnostic notes appears later herein. Some errors may be readily corrected, while others may require that the CLEAR key be actuated and the problem begun again.

The four basic arithmetic operations comprising addition, subtraction, multiplication, and division may be easily accomplished with the calculator. The first operand is entered; the desired operation key is actuated; the second operand is entered; and then the EQUALS key is actuated to execute the calculation. The result is placed in the X-register. When performing calculations involving more than one operator, each successive operation uses the result of the previous operation.

A red busy light on the keyboard flashes whenever the calculator is performing a function and cannot accept key actuations. When the calculator is executing a library program stored in a plug-in ROM or PROM, the busy light may remain on for several seconds. This light simply serves to remind the operator that the calculator will ignore any key actuations which occur during the time it is busy.

Negative numbers are entered by first keying in the number and then changing its sign. The sign is changed by successively actuating the SHIFT key and the LEFT PARENTHESIS key. Negative numbers are printed in red on the output printer.

As discussed above, the calculator performs successive mathematical operations by using the result of the previous operation. By using the LEFT PARENTHESIS and RIGHT PARENTHESIS keys, operations may be grouped together just as is done in standard mathematical notation involving parentheses. Use of parentheses in expressions eliminates the need for storing and recalling intermediate results. The output printer prints the result of each operation within parentheses at the time each right parenthesis is entered. Parentheses may be nested up to and including five levels.

The EXPONENT key is used to raise any number to any power. The number to be raised is entered, followed by the EXPONENT key, followed by the power.

The PERCENT key may be used in conjunction with all four arithmetic operators to calculate, for example, a percentage of a number in the X-register or to further use a percentage of a number in the X-register within a calculation. For example, if it is desired to calculate 6% of 39.95, the user would enter 39.95, followed by the MULTIPLY key, followed by 6, followed by the PER- CENT key, terminated by the EQUALS key, to give a result of 2.40. As a further example, if the user wishes to discount or subtract 20% from 80, he would first enter 80, followed by the SUBTRACT key, followed by 20, followed by the PERCENT key, terminated by the EQUALS key, to give a result of 64. As a final example, if it is desired to calculate the simple interest for a term of 2 years on $500 at 7%, the user would first enter 500, followed by the MULTIPLY key, followed by 7, followed by the PERCENT key, followed by the MULTIPLY key, followed by 2, terminated by the EQUALS key, to give a result of $70.

The output printer unit is associated with several keys which control its operation. The PRINT OFF key suppresses tallying of keyboard operations on the printer, but allows printing of the diagnostic notes plus CLEAR. Actuation of the PRINT key prints the current contents of the X-register, regardless of whether the PRINT OFF mode is in effect. The symbol # accompanies each number printed by actuating the PRINT key. The PAPER key is used to quickly advance the printer paper. When the calculator is turned on the display and print format is automatically set to ROUND 2. This means that each number displayed and/or printed is shown with two digits to the right of the decimal point. This format can be altered to indicate from zero to six decimal point digits by actuating the ROUND key followed by the appropriate number. Printed and displayed numbers may be shown in floating point, or scientific notation by actuating the ROUND key followed by the DECIMAL POINT key.

Some of the calculator keys represent dual functions, distinguished by whether actuation has been preceded by actuation of the SHIFT key. Actuation of the SHIFT key followed by the EXPONENT key operates to calculate the reciprocal of the contents of the X-register. Actuation of the SHIFT key followed by the DIVIDE key results in calculating the common logarithm of the number in the X-register. Actuation of the SHIFT key followed by the MULTIPLY key is used to calculate the natural logarithm of the contents of the X-register.

Actuation of the SHIFT key followed by the ADD key operates to raise the Naperian logarithm base e to the power indicated by the contents of the X-register. Actuation of the SHIFT key followed by the SUBTRACT key acts to divide the number in the X-register by 12.

When solving problems involving the entry of many numbers in the same form, such as dollars and cents, the AUTO DECIMAL POINT key may be used to automatically place the decimal point at a specified position in each number entry. This eliminates physically depressing the DECIMAL POINT key at the proper point during entry of each number. The place at which the the decimal point is automatically located is specified by the current rounding format. For instance, if the calculator is operating in round 2 format and the automatic decimal point feature is being used, the decimal point will be placed so that two digits will be indicated to the right thereof.

The RT-register accumulates results that are placed in the X-register each time the EQUALS key is actuated. To recall the contents of the RT-register to the X-register, and at the same time display and print the new contents of the X-register, the user simply actuates the SHIFT key followed by the EQUALS key.

We claim:

1. An electronic calculator comprising:

keyboard input means for entering information into the calculator;

memory means for storing information entered into the calculator; and processing means coupled to said keyboard input means and memory means, said processing means being responsive to information entered from said keyboard input means and to operating states within the calculator for selectively performing calculations and for providing an output indication of the results of those calculations;

said processing means including logic means responsive to designation of an automatic decimal point mode for automatically placing a decimal point at any designated one of a plurality of positions in noninteger data subsequently entered into the calculator from said keyboard input means without the necessity of manual entry of the decimal point in the noninteger data by the user.

2. An electronic calculator as in claim 1 wherein said keyboard input means includes decimal point control means for designating placement of the decimal point at any one of said plurality of positions in noninteger data that is subsequently entered into the calculator, and automatic decimal point mode control means for designating the automatic decimal point mode and for causing said logic means to automatically place the decimal point at the one of said plurality of positions, designated by said decimal point control means, in noninteger data subsequently entered into the calculator.

3. An electronic calculator as in claim 2 further comprising: output display means coupled to said processing means, said output display means being operative for visually displaying information, including noninteger data, entered into the calculator from said keyboard input means;

said logic means being operative for enabling said output display means to display the decimal point at the one of said plurality of positions designated by said decimal point control means in noninteger data entered into the calculator and visually displayed by said output display means.

4. An electronic calculator as in claim 2 further comprising:

output printer means coupled to said processing means, said output printer means being operative for printing information, including noninteger data, entered into the calculator from said keyboard input means;

said logic means being operative for enabling said output printer means to print the decimal point at the one of said plurality of positions designated by said decimal point control means in noninteger data entered into the calculator and printed by said output printer means.

* * * * *

UNITED STATES PATENT AND TRADEMARK OFFICE
CERTIFICATE OF CORRECTION

PATENT NO. : 4,156,921

DATED : May 29, 1979

INVENTOR(S) : Freddie W. Wenninger et al

It is certified that error appears in the above-identified patent and that said Letters Patent are hereby corrected as shown below:

Column 1, line 42, cancel "Another" and insert --The principal--;

Signed and Sealed this

Twenty-second Day of April 1980

[SEAL]

Attest:

SIDNEY A. DIAMOND

Attesting Officer

Commissioner of Patents and Trademarks